United States Patent Office 2,950,329
Patented Aug. 23, 1960

2,950,329

PRODUCTION OF CHLORSTYRENES

Franz Reicheneder, Hubert Suter, and Helmut Orth, Ludwigshafen (Rhine), Erich Stoeckl, Mannheim, and Matthias Seefelder, Ludwigshafen (Rhine)-Oppau, Germany, assignors to Badische Anilin- & Soda-Fabrik Aktiengesellschaft, Ludwigshafen (Rhine), Germany No Drawing. Filed Aug. 16, 1957, Ser. No. 678,538

Claims priority, application Germany Aug. 28, 1956

9 Claims. (Cl. 260—650)

This invention relates to a process for the production of chlorstyrenes by chlorination of ethylbenzene or nuclear-chlorinated ethylbenzene in the gas phase in the presence of chlorination catalysts and subsequent dehydrogenation of the resultant chlorinated products in the gas phase. In particular the invention relates to a process for the production of chlorostyrenes by chlorination of ethylbenzene and nuclear-chlorinated ethylbenzene in the presence of platinum metals or their compounds, especially in the presence of platinum metal halides.

A further object of the invention is the working up of the resultant dehydrogenation mixture by distillation or by polymerization and depolymerization after distilling off the non-dehydrogenated fraction.

Various processes are known for the production of nuclear-halogenated styrenes. These for the greater part avoid the problem of the nuclear halogenation of styrene or ethylbenzene and lead to chlorstyrene by a roundabout method. Thus for example an attempt has been made to avoid the problem of selective nuclear halogenation by treating paradichlorbenzene and ethylene, by way of 2.5-dichlorethylbenzene, by bromination and subsequent dehydrohalogenation by means of alcoholic caustic potash.

The direct methods either lead to unsatisfactory yields or are not usable technically by reason of small throughputs. For example when ethylbenzene is chlorinated in liquid phase in the presence of iron and iodine catalysts, the conversion in the subsequent dehydrogenation is low and therefore a separation of the isomer mixture of the chlorination stage and separate dehydrogenation of the ortho- and para-fractions are necessary because the boiling points of ortho-chlorstyrene and para-ethylchlorbenzene lie too close together.

The catalytic chlorination of organic compounds, as has been attempted for example for xylene and benzene, with the aid of entraining methods in which the substance to be chlorinated is taken up by an inert gas current in accordance with the tension and led through the reaction chamber, does not provide any useful technical solution of the problem of the selective nuclear halogenation of ethylbenzene.

We have now found that the said difficulties are overcome and a trouble-free selective nuclear chlorination with very high conversions is achieved by treating ethylbenzene or partly nuclear-halogenated ethylbenzenes at the boiling temperature or at higher temperatures in the gas phase with chlorine in the presence of a chlorination catalyst and dehydrogenating the resultant chlorination product in the presence of dehydrogenation catalysts in the gas phase.

According to the process there may be chlorinated not only ethylbenzene but also other partly nuclear-chlorinated ethylbenzenes such as ethyl monochlorbenzenes and ethyl dichlorbenzenes.

The most favorable reaction temperatures in the chlorination stage lie between 140° and 400° C.; it is preferable to work at 170° to 320° C.

In carrying out the process, the substance to be chlorinated, for example the ethylbenzene, is vaporized and continuously introduced into the reaction vessel, if desired after dilution with inert gas, and led over the catalyst. It is also possible however to drip the ethylbenzene directly into the reaction chamber which is heated above the boiling temperature. In many cases it is also preferable to lead into the reaction chamber an inert organic solvent, for example a chlorinated hydrocarbon, such as carbon tetrachloride, or a hydrocarbon, such as low boiling naphtha fractions. The same procedure is followed, with changed temperature conditions, for the chlorination of nuclear-chlorinated ethylbenzenes. The chlorine, if desired mixed with nitrogen or another inert gas, is introduced into the reaction chamber and usually led in circulation; in this way the consumption of chlorine is reduced. Mixtures of chlorine and nitrogen are used in general in the volumetric ratio within the limits of 5:1 to 1:3 and, indeed, in monochlorination usually with a chlorine-nitrogen mixture in the volumetric ratio 1:1. By raising the chlorine content of the gas mixture, the multiple chlorination, for example the chlorination of ethylbenzene, in one operation to ethyldichlorbenzene is promoted. Furthermore, by leading the chlorine by means of nitrogen or other inert gas there is provided a favorable possibility for withdrawing heat and therefore for maintaining a desired temperature. Since hydrogen chloride is also formed in the chlorination stage, it is preferable to lead the circulating gas through a separation plant in order to prevent any enrichment in hydrogen chloride. At the same time the chlorine level can be adjusted according to the intended degree of chlorination by appropriate supply of fresh gas and withdrawal of return gas.

It is advantageous to select the ratio of chlorine to ethylbenzene within the limits of 1:1 to 10:1 and in this way it is possible to achieve single, double or triple or even higher chlorine substitution in the nucleus.

It is possible to work in the process either at reduced, normal or increased pressure. Usually normal pressure is used.

The platinum metals, for example platinum, palladium, rhodium and irridium, or their compounds, especially however the platinum metal chlorides, have proved suitable as catalysts. Palladium chloride exhibits quite specially good properties which as compared with the other platinum metals has also the advantage that it is the cheapest. When using palladium chloride as catalyst for the selective nuclear halogenation no fatigue phenomena are observable even after continuous operation for weeks. Moreover in the case of palladium chloride the selective action in the nuclear substitution is considerably more strongly pronounced than in the case of rhodium or iridium chloride.

The catalysts can be used as such or applied to carriers, as for example aluminium oxide, silica gel, pumice, active carbon or fuller's earth. The proportion by weight of the platinum metals or their compounds which are applied to the carriers can vary between 0.5 and 15%. A proportion by weight of 1.5 to 4.5% with reference to the total amount of catalyst is especially favorable. For the production of the catalyst, the carrier substance can be impregnated with a concentrated aqueous solution of the platinum metal chloride and heated. In this way there is partly formed the oxide of the metal but the chloride is reformed by the subsequent action of the chlorine.

It is also possible however to apply the platinum metal itself to the carrier because the chloride can form under the reaction conditions. Optimum results are also achieved with catalysts prepared in this way if the catalysts are predeveloped in a current of pure chlorine. It is favorable to carry out this predevelopment at the reaction temperature in question.

The catalysts may be rigidly arranged in the reaction vessel or may be moved through the reaction vessel. It is also possible in carrying out the process to keep the catalyst in fluidized motion in granulated, pulverulent or tabletted form.

Active carbon is also suitable as a catalyst for selective nuclear substitution. It is especially advantageous to treat the active carbon used previously with chlorine.

For the dehydrogenation, the chlorination product or a fraction of the chlorination product, for example a mixture of the isomeric ethyl monochlorbenzenes, can be led in vapor phase together with superheated steam, if desired in the presence of a diluent inert gas, over the dehydrogenation catalyst. In this case the vaporisation can be effected by the superheated steam itself. The vapor can however also be supplied separately. The steam is used preferably in excess, in general the ratio of weight of chlorination product to steam amounts within the limits from about 1 to 7 to about 1 to 1, preferably 1 to 3. As in the first stage of the process, the substance to be dehydrogenated can also be vaporized in the reaction vessel itself.

As catalysts for the dehydrogenation there are suitable in general the dehydrogenation catalysts known in the art, as for example palladium, nickel and copper compounds and the oxides of the 5th and 6th sub-groups of the periodic system, as well as mixed catalysts. Good results are obtained for example with a mixed catalyst consisting predominantly of zinc oxide and containing small amounts of non-volatile alkali or alkaline earth salts of inorganic acids and if desired alkali or alkaline earth oxides or hydroxides. It is surprising that these alkaline catalysts which are suitable for the dehydrogenation of ethylbenzene should also favorably influence the dehydrogenation of nuclear chlorinated ethylbenzene in which hydrogen chloride is set free in small amounts.

The use of mixed catalysts which contain a mixture of the oxides of the metals of the 5th and 6th sub-groups of the periodic system has also proved advantageous. These mixed oxides may also have added to them other oxides, for example zinc oxide, aluminium oxide, especially the modification known as gamma-aluminium oxide, magnesium oxide, and thorium oxide. We include especially in the above described oxides the mixtures of the oxides of vanadium, chromium, molybdenum, tungsten and uranium. Individual catalyst compositions which have proved especially suitable are for example a mixture of vanadium and zinc oxides which contains about 70% of vanadium oxide and about 30% of zinc oxide, or a mixture of vanadium and cadmium oxides, a mixture of chromium and cadmium oxides which contains the two components in equal parts, a mixture of tungsten oxide and magnesium oxide, a mixture of vanadium oxides with gamma-aluminium oxide which has been prepared by kneading gamma-aluminium oxide with vanadic acid or its salts, for example the ammonium salt, or a mixture of vanadium oxide with magnesium or thorium and aluminum oxide. With these catalysts, both ethylchlorbenzene and ethyldichlorbenzene and also a mixture of ethylchlorbenzenes of different degrees of chlorination can be dehydrogenated with equal success. It is of advantage to use these catalysts, in carrying out the dehydrogenation, under reduced pressure and in this case the addition of steam, which is almost invariably necessary in the normal pressure process, can be dispensed with. This represents a simplification of the process because the heating up of the steam to 600° C., i.e. the dehydrogenation temperature, is not necessary. When carrying out the dehydrogenation under reduced pressure it is preferable to proceed at 10 to 300 Torr, preferably at 50 to 150 Torr.

By weighting the benzene nucleus in the ethylbenzene with chlorine, a higher conversion is achieved in the dehydrogenation. As by-products there occur only small amounts of styrene and benzene, as well as hydrochloric acid. It may be preferable however not to allow the dehydrogenation to proceed to completion in a single passage through the reaction vessel. In this case the residence time at the catalyst is reduced by known means, for example by more reduced pressure or by a smaller catalyst zone.

In the second stage of the process the operation is carried out at atmospheric, increased or reduced pressure, for example in an externally heated reaction vessel. When carrying out the dehydrogenation at normal pressure it is also possible however to introduce all the heat necessary for the dehydrogenation by superheated steam. The most favorable dehydrogenation temperature lies between 500° and 650° C. The whole of the chlorination product of the first stage, including the unconverted ethylbenzene can be dehydrogenated, if desired after preliminary purification.

The chlorination product may however also be separated prior to dehydrogenation into different fractions and subjected to dehydrogenation singly or in any desired combination. Unconverted ethylbenzene is preferably separated before the dehydrogenation and returned to the first stage.

For the recovery of the more highly chlorinated styrenes the procedure may also be that ethyl monochlorbenzene obtained in the first stage is again reacted with chlorine to dichlorinated or more highly chlorinated ethylbenzenes.

The working up of the mixture obtained after dehydrogenation, which may contain for example styrene, ethylchlorbenzene, ethyldichlorbenzene, chlorstyrene and dichlorstyrene, is possible in known manner by simple fractional distillation, usually under reduced pressure.

All the polymerizable components can however be separated from the dehydrogenation mixture in a simple way by treating the dehydrogenation mixture under polymerizing conditions, separating the non-polymerized components and splitting up the polymer again by depolymerization.

The polymerizing treatment of the dehydrogenation mixture, which may still contain ethylchlorbenzene, is effected in the presence or absence of polymerization catalysts. Dehydrogenation mixtures with a chlorstyrene content between 20 and 90% may be worked up. The use of the process is of special advantage when mixtures which contain 30 to 60% of chlorstyrene are formed by the dehydrogenation.

The process can be carried out at reduced, normal and elevated temperature. At reduced and at normal temperature, preferably at +5° to about 30° C., it is preferable to use catalysts in the polymerization of the dehydrogenation mixture, as for example redox systems such as per compounds with soluble organic reducing agents, as for example sulfinic acids, formic acids, amines, organic hydrazine compounds, mercaptans, alpha-ketols and various sugars. Soluble metal salts, as for example cobalt naphthenate and iron laurate, or soluble heavy metal complexes, as for example iron acetyl acetonate and nickel acetoacetic ester, may however also be used either singly or in admixture. At elevated temperature, for example between 40° and 100° C., there may be used above all peroxides, as for example hydrogen peroxide, dialkyl and diaryl peroxides, diacyl and diaroyl peroxides, ketoperoxides, peroxy acids and peroxy esters and thermally unstable azo compounds, as polymerization catalysts. At still higher temperatures, for example above 100° C., the addition of polymerization catalysts can in many cases be dispensed with because in this temperature range the polymerization reaction is initiated by the action of heat alone. The polymerization may however be promoted by irradiation with light.

If the dehydrogenation of the chlorination mixture has been carried out in the presence of steam, it is of advantage to dry the dehydrogenation mixture before the polymerization. The drying can be effected in simple manner by separating the aqueous phase and drying the organic phase over agents which extract water, as for example over caustic soda, calcined sodium sulfate, calcium chloride, calcium carbide or advantageously over caustic potash.

Depending on the content of chlorstyrene in the dehydrogenation mixture there is obtained by the polymerization a more or less viscous mass from which the non-dehydrogenated components, for example ethylchlorbenzene, can be distilled off at normal pressure, advantageously at reduced pressure, for example at 0.1 to 100 Torr, in a simple way. The polymer remaining, which in general includes less than 1% of ethylchlorbenzene, solidifies at room temperature to a solid brittle resin.

For the subsequent depolymerization the said polymer can either be mechanically comminuted or used in the fused condition. The depolymerization is in general carried out thermally and it is preferable to use an iron apparatus so that the catalytic action of the iron walls at high temperature, which effects a specially good yield of monomers, may be utilized. The thermal depolymerization may however be carried out in any usual distillation apparatus or in thin layer vaporisers. Operation is at temperatures between 250° and 650° C., advantageously at 400° to 600° C.

The depolymerization can be carried out at atmospheric or reduced pressure. When working at reduced pressure, for example at 20 to 200 Torr, the losses by cracking are remarkably low. However a mixture of monomers, dimers and trimers is formed. On the other hand when working at atmospheric pressure the proportion of dimers and trimers in the depolymerization mixture obtained is strongly suppressed, but the loss by cracking is considerably greater by reason of the longer residence period. An advantageous method of operation consists in carrying out the depolymerization in two stages. In the first stage under reduced pressure, splitting up is mainly to monomers while avoiding loss by cracking and after separating the monomeric components by distillation, only the remaining dimers or short-chained polymers of chlorstyrene are depolymerized under atmospheric pressure (in the second stage).

The crude monomeric chlorstyrene can be distilled again, a small amount of styrene being obtained as first runnings. For most purposes of use of the chlorstyrene, however, a separation of this fraction of styrene is not necessary.

The monochlorinated or more highly chlorinated styrenes or mixtures thereof made accessible by the process according to the present invention can be worked up in the usual way to polymers which have the advantage of more difficult inflammability up to non-inflammability as compared with polystyrene, depending on the chlorine content. Moreover they have a higher softening point which is desirable for many purposes of use.

The following examples will further illustrate this invention but the invention is not restricted to these examples. The parts, unless otherwise specified, are parts by weight.

*Example 1*

Through a vertical tube which contains a rigidly-arranged catalyst consisting of aluminium oxide with 1.5% of palladium chloride there is led hourly at a temperature of 180° to 200° C. a mixture of chlorine and nitrogen in the volumetric ratio 70:70 which has already been preheated to the said temperature. At the same time 120 parts of ethylbenzene per hour are supplied in a continuous stream to the catalyst through a vaporizer heated to 200° to 220° C. The weight ratio of chlorine to ethylbenzene is 225:120.

At the lower end of the tube, the chlorination product is separated into gaseous and liquid constitutents through a graduated separating and cooling system. The gaseous constituents, chlorine and nitrogen, are returned to the gas preheater through an apparatus for the separation of the hydrogen chloride after regulation of the chlorine level.

The liquid constituents, i.e. 125 parts per hour, are fractionally distilled at 20 Torr after a short evaporation. After a first runnings of 12 parts of ethylbenzene, which is returned, there are obtained two fractions. The first fraction (87 parts) at the boiling point 80° to 100° C. ($n_D^{20}$=1.5200 to 1.5300, chlorine content 25.00% according to analysis and 25.3% by calculation) is pure ethylmonochlorbenzene. The second fraction (25 parts) at the boiling point 100° to 120° C. ($n_D^{20}$=1.5400 to 1.5500, chlorine content 40.10% according to analysis, 40.60% by calculation) is pure ethyldichlorbenzene.

Fraction 1 consists mainly of the ortho- and para-isomers. The meta-isomer occurs only in small amounts. Fraction 2 contains mainly the 2.4- and 2.5-isomers. There remains a trivial residue of more highly chlorinated products.

Even by a single passage, a conversion of up to 90% can be achieved; the yields, with reference to converted ethylbenzene, are correspondingly higher when the unreacted initial material is returned. The space-time yield amounts to 15 kilograms per liter of catalyst volume per day.

For dehydrogenation, the chlorination product is led with superheated steam at 650° C. over a rigidly-arranged catalyst consisting mainly of zinc oxide in a tube which is heated to 600° to 650° C. To 300 parts of steam 100 parts of ethylmonochlorbenzene per hour are supplied before introduction into the tube. From the lower part of the tube the reaction product passes through a cooler into a separator. The liquid product (96 parts per hour) is separated, dried and subjected to fractional distillation at 2 Torr:

1st fraction: up to 60° C., $n_D^{20}$=1.4900 to 1.5350, 7 parts per hour
2nd fraction: 75° to 88° C., $n_D^{20}$=1.5350 to 1.5475, 6 parts per hour
3rd fraction: 89° to 93° C., $n_D^{20}$=1.5574 to 1.5650, 78 parts per hour.

The first fraction consists of a mixture of ethylchlorbenzene and styrene and is returned. In the second fraction a mixture of ethylchlorbenzene and chlorstyrene is present. This fraction is also returned. The third fraction is a mixture of monomeric ortho-, para- and meta-chlorstyrene. There remains a small residue. In the dehydrogenation stage a yield of more than 90% is achieved with reference to converted ethylmonochlorbenzene.

The chlorination product of the second fraction (ethyldichlorbenzene) is dehydrogenated and worked up in the same way.

With an hourly supply of 100 parts of the second fraction with 500 parts of steam, the following fractions are obtained:

1st fraction: B.P.$_{20}$ 85° to 95° C., $n_D^{20}$=1.5575 to 1.5650, 21 parts per hour
2nd fraction: B.P.$_{20}$ 97° to 105° C., $n_D^{20}$=1.5650 to 1.5750, 5 parts per hour
3rd fraction: B.P.$_{20}$ 105° to 120° C., $n_D^{20}$=1.5750 to 1.5850, 68 parts per hour.

A small residue remains.

The first fraction consists of monochlorstyrene; the second is a mixture of dichlorethylbenzene and dichlorstyrene and is returned. In the third fraction pure dichlorstyrene is present. The dehydrogenation proceeds practically quantitatively, but the dehydrogenation product contains monochlorstyrene besides the dichlorstyrenes.

The following table summarizes a series of examples in which the chlorination is carried out in the same way but with different temperatures and with other catalysts. The total yield, with reference to converted ethylbenzene, is the same as when using palladium chloride. The space-time yields on the other hand are lower than those attainable with palladium chloride.

| catalyst | carrier | temperature of the reaction chamber, degrees | space-time yield in kg. per liter of catalyst volume per day |
|---|---|---|---|
| $RhCl_3$ | $Al_2O_3$ | 230 | 8 |
| $RhCl_3$ | $SiO_2$ | 300 | 6 |
| $IrCl_3$ | $Al_2O_3$ | 150 | 7 |
| $IrCl_4$ | $Al_2O_3$ | 200 | 10 |
| $IrCl_3$ | $SiO_2$ | 250 | 12 |
| $K_2(PtCl_6)$ | $SiO_2$ | 200 | 11 |
| activated carbon | | 150 to 160 | 10 |

Example 2

120 parts of ethylbenzene are reacted per hour with chlorine as described in Example 1. In variation of the method of operation according to Example 1, the volumetric proportion of chlorine in the current of nitrogen is 150:50. The ratio by weight of chlorine to ethylbenzene is then 480:120. The proportion of ethyldichlorbenzene in the chlorination product thereby rises to 50%. The liquid fraction of the chlorination product, i.e. 140 parts per hour, is worked up according to Example 1. After a first runnings of 10 to 12 parts per hour, which is returned, there are obtained two fractions:

(1) 57 parts per hour of the B.P.$_{20}$ 80° to 100° C. and
(2) 68 parts per hour of the B.P.$_{20}$ 100° to 120° C.

The first fraction consists mainly of ortho- and para-isomers of ethylmonochlorbenzene.

The second fraction is pure ethyldichlorbenzene. There remains a trivial residue of more highly chlorinated products.

By a single passage, a 90% conversion is achieved. The yield of chlorination products, with reference to converted ethylbenzene, amounts to more than 90% of the theoretical yield. The dehydrogenation of the two fractions can be carried out as in Example 1 jointly or singly.

Example 3

100 cubic centimeters of catalyst consisting of aluminium oxide of 0.2 to 1.7 millimeter grain size with 2% of palladium chloride are charged into a fluidized layer chamber 560 millimeters long and 60 millimeters in diameter. A mixture of 70 liters of chlorine and 70 liters of nitrogen is introduced per hour upwardly into the chamber so that the catalyst is kept in fluidized condition. 120 grams of ethylbenzene are dripped per hour at a temperature of 200° C. into the chamber. The separation of the chlorination product takes place by a cooler with a separator arranged behind the fluidized layer chamber. Working up is effected as in Example 1. By distilling the chlorination product obtained, there are obtained, after a first runnings of 12 grams per hour, 83 grams per hour of ethylmonochlorbenzene at the boiling point 80° to 100° C. (at 20 Torr) and 30 grams per hour of ethyldichlorbenzene at the boiling point 100° to 120° C. (at 20 Torr). The throughput in the fluidized layer chamber is twice as high as in Example 1 under the same reaction conditions.

For the dehydrogenation, 100 grams of ethylmonochlorbenzene per hour are dripped from a dropping funnel into a vaporizer and the vapor led over a catalyst consisting of 30% of zinc oxide and 70% of vanadium oxide in a tube of 0.5 liter capacity which is heated to 600° C. and evacuated to 30 Torr. The vapor leaving the tube is condensed. There are obtained per hour 95 grams of a crude product which contains 33 grams of dehydrogenated product besides 62 grams of unchanged initial material.

If the dehydrogenation is carried out in the same way but with other catalysts or with changed reaction temperature or vacuum, the conversions set out in the following table are obtained:

| | Catalyst | Temperature, °C | Pressure, Torr | Conversion, percent |
|---|---|---|---|---|
| (1) | 30% zinc oxide / 70% vanadium oxide | 700 | 30 | 80 |
| (2) | 30% zinc oxide / 70% vanadium oxide | 650 to 660 | 100 | 25 |
| (3) | 35% cadmium oxide / 65% vanadium oxide | 600 | 30 | 35 |
| (4) | 85% zinc oxide / 5% calcium oxide / 3% aluminium oxide / 7% potassium compounds | 590 to 610 | 100 | 25 |
| (5) | 25% magnesium oxide / 75% vanadium oxide | 600 | 100 | 40 |
| (6) | 20% vanadium oxide / 25% thorium oxide / 55% aluminium oxide | 600 to 610 | 50 to 80 | 35 to 40 |
| (7) | 20% vanadium oxide / 80% aluminium oxide | 600 to 610 | 50 to 80 | 35 |
| (8) | 43% cadmium oxide / 57% chromium oxide | 600 | 100 | 20 |
| (9) | 55% magnesium oxide / 45% tungsten oxide | 600 | 100 | 45 |

The catalyst (4), which is given merely by way of comparison is one of the known alkaline dehydrogenation catalysts.

Example 4

A crude mixture of chlorination products such as are obtained in the first stage according to Example 1 is vaporized for a short time under reduced pressure. After the disengagement of the dissolved gases, 100 parts per hour of a mixture of 10% of ethylbenzene, 70% of ethylmonochlorbenzene and 20% of ethyldichlorbenzene are led, without separation, together with 500 parts of steam, at 600° to 650° C., over a dehydrogenation catalyst which consists in the main of zinc oxide and small amounts of non-volatile alkali or alkaline earth salts of inorganic acids. From the lower part of the reaction vessel, the reaction product is led through a cooler into a separator. 95 parts per hour of dehydrogenation product are obtained which can be polymerized, if necessary after purification by distillation.

Example 5

A mixture of chlorine and nitrogen in the volumetric ratio 70:70 is preheated to 190° to 210° C. and then led through a vertical tube, heated to the same temperature, which contains as catalyst aluminum oxide with 1.5% of palladium chloride which is rigidly arranged therein. At the same time 160 parts per hour of ethylchlorbenzene is supplied to the catalyst in a continuous stream through a vaporizer heated to 230° to 250° C. The weight ratio of chlorine to ethylbenzene is 225:160.

From the lower end of the tube, the chlorination product is separated by a graduated separation and cooling system into gaseous and liquid fractions. The gaseous fraction, consisting of chlorine, nitrogen and hydrogen chloride, is returned to the gas preheater through an apparatus for the separation of the hydrogen chloride, after regulation of the chlorine level.

The liquid fraction, i.e. 168 parts per hour, is fractionally distilled at 20 Torr after vaporization for a short time. After a first runnings of 14 parts, there are obtained at 100° to 120° C. at 20 Torr 128 parts of ethyldichlorbenzene which in the main is a mixture of ethyl-2.4-dichlorbenzene and ethyl-2.5-dichlorbenzene.

The conversion and space-time yields correspond to the results which are achieved in the chlorination of ethylbenzene according to Example 1.

For dehydrogenation, 50 parts per hour of the chlorination product (ethyldichlorbenzene) are led over a rigidly-arranged catalyst consisting of 35% of cadmium oxide and 65% of vanadium oxide in a tube of 0.3 liter capacity which is heated to 650° C. and evacuated to 20 Torr. The supply of the ethyldichlorbenzene takes place by a dropping funnel through a vaporizer. The dehydrogenation mixture is led from the lower part of the tube through a cooler into a separator.

42 parts per hour of a dehydrogenation mixture are obtained which consists of 52% of unconverted initial material, 10% of styrene, 8% of chlorstyrene and 30% of dichlorstyrene.

Example 6

5 parts of a catalyst (methyl ethyl ketone peroxide) are added to 5,000 parts of a dehydrogenation mixture which has been obtained by chlorination of ethylbenzene and dehydrogenation according to Example 3 and which contains 35% of chlorstyrene, and the whole heated to 60° C. while stirring. The polymerization is substantially ended after about 5 to 6 hours. After again adding 5 parts of catalyst, the whole is further polymerized for 3 to 4 hours at 80° C. The viscous liquid obtained is then distilled at a temperature rising from 60° to 140° C. and at a pressure of 15 Torr. 3,050 parts of ethylchlorstyrene pass over which still contain about 100 parts of chlorystyrene. This distillate is preferably again subjected to dehydrogenation. The residue of 1,900 parts corresponds to a polymer yield of 95%.

The residue, which at 200° C. is viscous, is introduced in this form into a thin layer vaporizer of iron for the purpose of depolymerization. The walls of the thin layer vaporizer are heated to 550° C. In the course of 2 hours, 1,860 parts pass over at 30 Torr pressure. The crude distillate is fractionated and there are obtained 130 parts of styrene as first runnings and 1,300 parts of chlorstyrene as the main fraction. The residue of 430 parts, which contains the fraction of dimers and trimers, is then depolymerized in the same way but at normal pressure. After the pure distillation there are obtained 101 parts of styrene, 195 parts of chlorstyrene and 95 parts of residue.

The total yield of monomeric chlorstyrene, with reference to polychlorstyrene, amounts to 91%.

Example 7

10 parts of cumene peroxide and 10 parts of paratoluene sulfinic acid are added at 22° C. as polymerization catalysts to 1,000 parts of a dehydrogenation mixture with 30% of chlorstyrene obtained by chlorination of ethylbenzene and dehydrogenation, and the whole allowed to stand for 60 hours. After distilling off the ethylchlorbenzene, there are obtained 295 parts of polychlorstyrene, corresponding to an 84% polymer yield. The depolymerizaton is carried out as in Example 6.

226 parts of chlorstyrene and 22.4 parts of styrene are obtained.

Example 8

1,000 parts of a dehydrogenation mixture with 78% of chlorstyrene, such as can be obtained by chlorination of ethylbenzene and dehydrogenation by the method according to Example 1, are polymerized as described in Example 6 at elevated temperature and the non-polymerizable fraction is separated. 740 parts of polychlorstyrene are obtained, corresponding to a polymer yield of 95%. By depolymerization, which is also carried out as described in Example 6, there are obtained after distillation 615 parts of chlorstyrene and 38 parts of styrene, i.e. 87% total yield with reference to polychlorstyrene.

We claim:

1. A process for the production of chlorstyrenes which comprises chlorinating with gaseous chlorine a compound selected from the group consisting of ethylbenzene, ethylmonochlorbenzene and ethyldichlorbenzene in the gas phase at a temperature from about 140° to about 400° C. in the presence of a chlorination catalyst containing a platinum metal, dehydrogenating the resultant mixture of chlorinated products in the gas phase in the presence of a dehydrogenation catalyst at a temperature from about 500° to about 650° C.

2. A process for the production of chlorstyrenes which comprises chlorinating with gaseous chlorine a compound selected from the group consisting of ethylbenzene in the gas phase, ethylmonochlorbenzene and ethyldichlorbenzene at a temperature from about 170° to about 320° C. in the presence of a chlorination catalyst containing a chloride of a metal selected from the group consisting of platinum, palladium, rhodium and iridium applied to an inert carrier, dehydrogenating the resultant mixture of chlorinated products in the gas phase in the presence of a dehydrogenation catalyst containing at least one oxide of a metal of the group consisting of magnesium, zinc, cadmium, aluminium, thorium, vanadium, chromium, molybdenum, tungsten and uranium at a temperature from about 500° to about 650° C. and at a pressure of from 10 to about 300 mm. Hg.

3. A process for the production of chlorstyrenes which comprises chlorinating with gaseous chlorine a compound selected from the group consisting of ethylbenzene, ethylmonochlorbenzene and ethyldichlorbenzene in the gas phase at a temperature from about 170° to about 320° C. in the presence of a chlorination catalyst containing a chloride of a metal selected from the group consisting of platinum, palladium, rhodium and iridium applied to an inert carrier, dehydrogenating the resultant mixture of chlorinated products in the gas phase in the presence of a dehydrogenation catalyst consisting predominantly of zinc oxide and containing small amounts of calcium oxide, alumina, and potassium compounds at a temperature from about 500° to about 650° C. and at normal pressure in the presence of an excess of steam.

4. A process for the production of chlorstyrenes which comprises chlorinating with gaseous chlorine a compound selected from the group consisting of ethylbenzene, ethylmonochlorbenzene and ethyldichlorbenzene in the gas phase at a temperature from about 140° C. to about 400° C. in the presence of a chlorination catalyst containing a chloride of a metal selected from the group consisting of platinum, palladium, rhodium and iridium, dehydrogenating the resultant mixture of chlorination products in the gas phase at a temperature from about 500° to about 650° C. and separating the chlorstyrenes from the resultant dehydrogenation mixture.

5. A process as claimed in claim 4 wherein the chlorination catalyst is palladium chloride.

6. A process for the production of nuclear-chlorinated ethylbenzene which comprises chlorinating with gaseous chlorine a compound selected from the group consisting of ethylbenzene, ethylmonochlorbenzene and ethyldichlorbenzene in the gas phase at a temperature from about 140° to about 400° C. in the presence of a chlorination catalyst containing a platinum metal.

7. A process as claimed in claim 6 wherein the chlorination catalyst is a chloride of a metal selected from the group consisting of platinum, palladium, rhodium and iridium.

8. A process as claimed in claim 6 wherein the chlorination catalyst is palladium chloride.

9. A process as claimed in claim 8 wherein the chlorination catalyst contains 1.5 to 4.5 percent palladium chloride on an inert carrier.

References Cited in the file of this patent

UNITED STATES PATENTS

| 2,110,829 | Dreisbach | Mar. 8, 1938 |
| 2,432,737 | Erickson et al. | Dec. 16, 1947 |
| 2,443,217 | Amos et al. | June 15, 1948 |

OTHER REFERENCES

Ellis: "Chemistry of Petroleum Derivatives," p. 775 (1934).